(12) United States Patent
Sutto

(10) Patent No.: US 9,580,319 B2
(45) Date of Patent: Feb. 28, 2017

(54) SYNTHESIS OF UNIT CELL SIZED OXIDE PARTICULATES

(71) Applicant: Thomas E. Sutto, Woodbridge, VA (US)

(72) Inventor: Thomas E. Sutto, Woodbridge, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 227 days.

(21) Appl. No.: 14/527,650

(22) Filed: Oct. 29, 2014

(65) Prior Publication Data
US 2015/0139893 A1   May 21, 2015

Related U.S. Application Data

(60) Provisional application No. 61/904,211, filed on Nov. 14, 2013.

(51) Int. Cl.
| | |
|---|---|
| *C01B 13/36* | (2006.01) |
| *C01F 5/14* | (2006.01) |
| *C01F 5/40* | (2006.01) |
| *C01F 17/00* | (2006.01) |
| *C01G 19/02* | (2006.01) |
| *C01G 45/02* | (2006.01) |
| *C01G 49/02* | (2006.01) |
| *C01G 51/04* | (2006.01) |
| *C01G 53/04* | (2006.01) |

(Continued)

(52) U.S. Cl.
CPC ............... *C01B 13/36* (2013.01); *C01F 5/14* (2013.01); *C01F 5/40* (2013.01); *C01F 17/0043* (2013.01); *C01G 1/02* (2013.01); *C01G 3/02* (2013.01); *C01G 19/02* (2013.01); *C01G 45/02* (2013.01); *C01G 49/02* (2013.01); *C01G 51/04* (2013.01); *C01G 53/04* (2013.01); *C01G 55/004* (2013.01); *C01P 2002/72* (2013.01); *C01P 2002/76* (2013.01); *C01P 2002/77* (2013.01); *C01P 2002/85* (2013.01); *C01P 2004/04* (2013.01); *C01P 2004/64* (2013.01); *C01P 2006/42* (2013.01); *C01P 2006/60* (2013.01)

(58) Field of Classification Search
CPC .......... C01B 13/36; C01G 45/02; C01G 1/02; C01G 53/04; C01G 19/02; C01G 49/02; C01G 55/04; C01G 3/02; C01F 5/40; C01F 17/0043; C01P 2002/72; C01P 2002/76; C01P 2002/77; C01P 2002/85; C01P 2004/04; C01P 2004/64; C01P 2006/60; C01P 2002/42
See application file for complete search history.

(56) References Cited

PUBLICATIONS

Yu, Taekyung, et al. "Single unit cell thick samaria nanowires and nanoplates." Journal of the American Chemical Society 128.6 (2006): 1786-1787.*

(Continued)

*Primary Examiner* — Richard M Rump
(74) *Attorney, Agent, or Firm* — US Naval Research Laboratory; Stephen T. Hunnius

(57) ABSTRACT

A method of making unit cell sized oxide particulates comprising preparing a water solution of a metal or ceramic salt or methanol solution of Pt, adding a 2-fold molar excess of $KO_2$ to the water solution and forming a reaction solution, spinning down the reaction solution, and creating oxide nanoparticles.

10 Claims, 5 Drawing Sheets

(51) Int. Cl.
    *C01G 55/00*     (2006.01)
    *C01G 1/02*     (2006.01)
    *C01G 3/02*     (2006.01)

(56) References Cited

PUBLICATIONS

Ekimov, A. I., Al L. Efros, and A. A. Onushchenko. "Quantum size effect in semiconductor microcrystals." Solid State Communications 56.11 (1985): 921-924.

Zhao, X. Q., et al. "γ-Fe 2 O 3 Nanoparticle preparation from oxidation of iron powder synthesized by laser-induced decomposition of Fe (CO) 5." Nanostructured materials 4.4 (1994): 397-402.

* cited by examiner

SYNTHESIS OF UNIT CELL SIZED OXIDE PARTICULATES

This application claims priority to and the benefits of U.S. Patent Application No. 61/904,211 filed on Nov. 14, 2013, the entirety of which is herein incorporated by reference.

BACKGROUND

Oxide nanoparticles are the subject of intense research efforts due to the wide variety of applications for which they are suited. Nanometer sized oxide particulates have been used in a wide variety of applications: electronic and magnetic devices, energy storage and generating systems and even medical applications. In general, there is a myriad of different synthetic techniques depending on the type of particle being prepared.

However, none of these techniques have demonstrated broad-spectrum applicability for oxide nanoparticle synthesis. The prior art techniques only produce micrograms of material.

Nanometer sized oxide particles were first considered theoretically in the mid 1980's, and synthesized a few years later. One of the first uses for metal oxide nanoparticles was $Fe_2O_3$ nanoparticles (≈50 nM) in magnetic data storage. Since that time, numerous other applications have been developed such as the Gretzel Solar cell, which uses dye-coated $TiO_2$ particles to absorb incident radiation. Additionally, metal oxide nanoparticles have been explored as high-energy cathode materials for lithium batteries.

The critical performance aspect of these nanoparticles relates to their very small size, which corresponds to increased surface area.

As a general rule, this reduction in size and increase in surface area significantly increase the desired interactions either by enhancing energy adsorption in the Gretzel cell, or increasing the amount and rate at which $Li^+$ can be intercalated and de-intercalated into the cathode.

Additionally, nanoparticles in general allow for new and varied approaches to creating nanometer to micron sized electrical components by creating transferable inks of these nanometer-sized particles. These techniques, such as laser printing, laser direct write printing, and 3-d printing take advantage to two key features of nanoparticles: small size allows for great flexibility and compactness in component design. The very small size of the particles also results in far greater reactivity. As such, annealing of an ink such as one composed of nanoparticulates of $CeO_2$ can create stable ceramic films at temperatures well below the melting point of $CeO_2$.

Unfortunately, one of the greatest problems facing the production of oxide-based nanoparticulates is the difficulty in rapidly synthesizing significant quantities of material. Typically, production requires several different steps to control particles size and to coat the nanoparticles to prevent them from aggregating, resulting in increasing particle size over time. These syntheses result in the formation of only micrograms of the oxide nanoparticulates.

SUMMARY OF THE INVENTION

Here we show for the first time a solution based flash oxidative synthesis of oxide nanoparticles through the use of $KO_2$ that produces oxide nanometer sized particles down to 0.5 nM, which corresponds to unit cell sized particles.

This synthetic technique described herein also produces these particles in gram scale quantities, which is an order of magnitude greater than previous techniques.

This synthetic approach not only works for metals, but also many different cations such as Mg, and Ce. Additionally, this synthetic technique can prepare nanoparticulate blends as precursors to many interesting compounds, such as ferroelectric, multiferroic, ferromagnetic or superconducting compounds.

These metal oxide particulates also show great promise for a multitude of electrochemical processes, from novel cathode materials to solar cells.

Also, because of their small size and the ability to prepare bulk quantities of these metal oxide particulates, they will also serve as excellent precursors for the formation of metallic nanoparticles of very small size.

Presented here is a description demonstrating and quantifying the synthesis and behavior of these nanoparticles and nanoparticulate blends.

DETAILED DESCRIPTION

Figure 1:
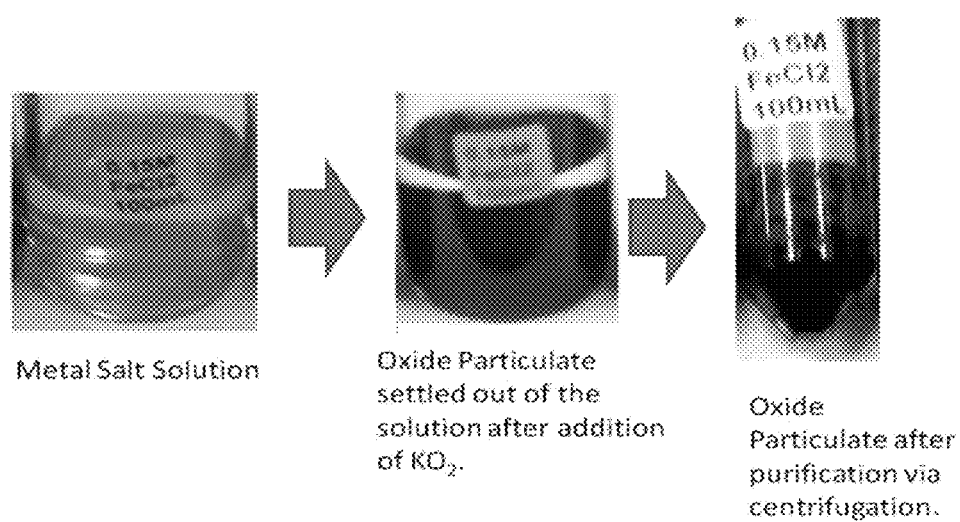
FIG. 1 is an illustration of a basic synthesis of the oxide particulates.

The general synthetic approach is a simple two step process, as shown in FIG. 1.

Here we show for the first time a solution based flash oxidative synthesis of oxide nanoparticles that produces oxide nanometer sized particles.

This synthetic technique described herein also produces these particles in gram scale quantities, which is an order of magnitude greater than previous techniques.

This synthetic approach not only works for metals, but also many different cations such as Mg, and Ce. Additionally, this synthetic technique can prepare nanoparticulate blends as precursors to many interesting compounds, such as ferroelectric, multiferroic, ferromagnetic or superconducting compounds.

Example 1

A water solution of the metal or ceramic salt is prepared.

To this rapidly stirring solution, a 2-fold molar excess of $KO_2$ is added quickly.

The solution stirs for approximately 10 minutes until it is cool enough to place into the plastic centrifuge tubes.

The solution is spun down to remove excess water, and this process is repeated until the remaining solution is pH neutral (typically 5 repetitions).

As a final cleansing of the nanoparticles, the material is re-suspended in methanol and spun down to remove the remaining water and methanol.

The samples are dried under a dynamic vacuum ($10^{-3}$ torr) at room temperature to avoid heating the material, which could result in increasing the particle size.

To date, this approach has made oxide nanoparticles using solutions of chlorides, sulphates or acetates; all of which resulted in the formation of oxide nanoparticles. This approach can work for many different types of solutions, including 2 row transition metals, Lanthanides, Actinides, semi-metals such as Bi or Sn, as well as other simple cations such as Ca, Sr, Ba, Sc, or Y.

Control of the final product was achieved by two methods, reaction time or temperature of the solution prior to adding the $KO_2$. Varying the length of time the solution was allowed to stir and react affected both the final oxidation and the particle size.

Example 2

Minimum particle size for each material was achieved when the reaction was quenched 1-2 minutes after the $KO_2$ was added by diluting the reaction mixture by 50% with methanol. For some reactions, this did not alter the final product for $Mg(OH)_2$, $TiO_2$, $CeO_2$, and $ZnO_2$. However, for the Mn, Fe, Co, Ni and Cu reactions, this quenching resulted in the formation of metal hydroxides. For Mn, Fe and Co, allowing the reaction to either proceed for approximately 20 minutes resulted in the formation of the $M_3O_4$ phase of each compound. For the Ni and Cu systems, prolonged reaction time resulted in the formation of NiO—OH and CuO, respectively. Prolonged reaction times also resulted in an increase in particle size into the hundreds of nanometer scale.

Example 3

By heating the solution before adding the $KO_2$, a mix of higher oxidation state compounds and larger particle sizes were observed for several systems. The Mn, Fe, Co, Ni and Cu systems formed mixes of $Mn_3O_4$ and $MnO_2$, $Fe_3O_4$ and $Fe_2O_3$, for example. However, in the case of the reaction of $SnCl_2$ with $KO_2$, $SnO_2$ was only formed when the reaction was heated to 90 C, and allowed to stir for 1 hour.

Example 4

The Pt system proved to be challenging. Oxidation in water resulted in the formation of a mix of insoluble Pt compounds that were primarily an amorphous brown color, possibly indicating $PtO_2$, or other mixed valence Pt compounds. In order to prepare a single phase Pt-0 compound, significant changes were made to the process.

Rather than performing the reaction in water, the reaction was carried out in methanol. In this instance, the $KO_2$ was added slowly due to the potential flammability of methanol.

However, since the oxidation of Pt is not exothermic, all of the $KO_2$ was added. As the reaction proceeded, the solution turned first clear yellow, then light brown, which then slowly turned black over 1 hour.

After rinsing and drying, x-ray analysis indicated the formation of a $Pt_2O$, with very small particle size.

Tables 1 and 2 detail the experimental results, including X-ray analysis. Table 1 lists the initial and final product, the average particle size, and the average number of unit cells per particle, assuming the particles are spherical. The number of unit cells was rounded to the nearest whole number.

TABLE 1

Particle Synthesis Analyses

| Starting Material | Product | Color | Particle Size (nM) | Volume | Unit Cells per Particle |
|---|---|---|---|---|---|
| $MgSO_4$ | $Mg(OH)_2$ | White | 0.990 | 40.840 | 24 |
| $Ti(SO_4)_2$ | $TiO_2$ (anatase) | Light Yellow | 0.610 | 130.8 | 2 |
| $FeCl_2$ | $Fe_3O_4$ | Black | 0.530 | 544.080 | 1 |
| $Mn(Ac)_3$ | $Mn_3O_4$ | Black | 0.540 | 314.400 | 1 |
| $CoSO_4$ | $Co_3O_4$ | Black | 1.790 | 516.370 | 11 |
| $Ni(Ac)_2$ | $Ni(OH)_2$ | Light Green | 1.460 | 38.500 | 86 |
| $Cu(Ac)_2$ | $Cu(OH)_2$ | Blue-green | 2.800 | 164.400 | 50 |
| *$Zn(Ac)_2$ | $ZnO_2$ | White | 1.630 | 115.084 | 38 |
| *$Zn(Ac)_2$ | $ZnO_2$ | White | 0.420 | 114.024 | 1 |
| $CeCl_3$ | $CeO_2$ | Yellow-orange | 0.750 | 181.700 | 2 |
| $SnCl_2$ | $SnO_2$ | Faint yellow | 0.850 | 71.550 | 9 |
| $H_2PtCl_6$ | $Pt_2O$ | black | 0.290 | 59.996 | 1 |

TABLE 2

Detailed X-ray Data

| Product | Space Group | a | b | c | Beta | Re % | S |
|---|---|---|---|---|---|---|---|
| $Mg(OH)_2$ | Fd-3m | 3.130(7) | 3.130(7) | 4.81(5) | 90. | 7.75 | 1.5225 |
| $TiO_2$ | I41/amd | 3.806(17) | 3.806(17) | 9.03(11) | 90.000 | 5.55 | 1.4342 |
| $Fe_3O_4$ | Fd-3m | 8.163(7) | 8.163(7) | 8.163(7) | 90.000 | 2 | 1.2425 |
| $Mn_3O_4$ | 141/amd | 5.759(12) | 5.759(12) | 9.48(2) | 90.000 | 7.5 | 1.602 |
| $Co_3O_4$ | Fd-3m | 8.023 | 8.023 | 8.023 | 90.000 | 0.92 | 1.8092 |
| $Ni(OH)_2$ | P-3m1 | 3.105(7) | 3.105(7) | 4.61(3) | 90. | 2.74 | 3.7594 |
| $Cu(OH)_2$ | Cmc21 | 2.954(3) | 10.569(17) | 5.266(4) | 90.000 | 5.19 | 1.4517 |
| ^$ZnO_2$ | Pa-3 | 4.862(3) | 4.865(3) | 4.865(3) | 90.000 | 5.49 | 1.7804 |
| *$ZnO_2$ | Pa-3 | 4.849(4) | 4.849(4) | 4.849(4) | 90.000 | 3.67 | 1.7168 |
| $CeO_2$ | Fm-3m | 5.664(11) | 5.664(11) | 5.664(11) | 90.000 | 6.49 | 1.3617 |
| $SnO_2$ | P42/mnm | 4.738(15) | 4.738(15) | 3.183(17) | 90.000 | 9.1 | 1.1884 |
| $Pt_2O$ | Pn-3m | 3.9141(7) | 3.9141(7) | 3.9141(7) | 90.000 | 5.93 | 1.7317 |

*Prepared by quenching the oxidation by adding 50 mL of methanol after a reaction time of 2 minutes.

^This data was reproduced after the sample was left dry at room temperature for 7 days. TEM images were also taken from this aged samples.

Figure 2:
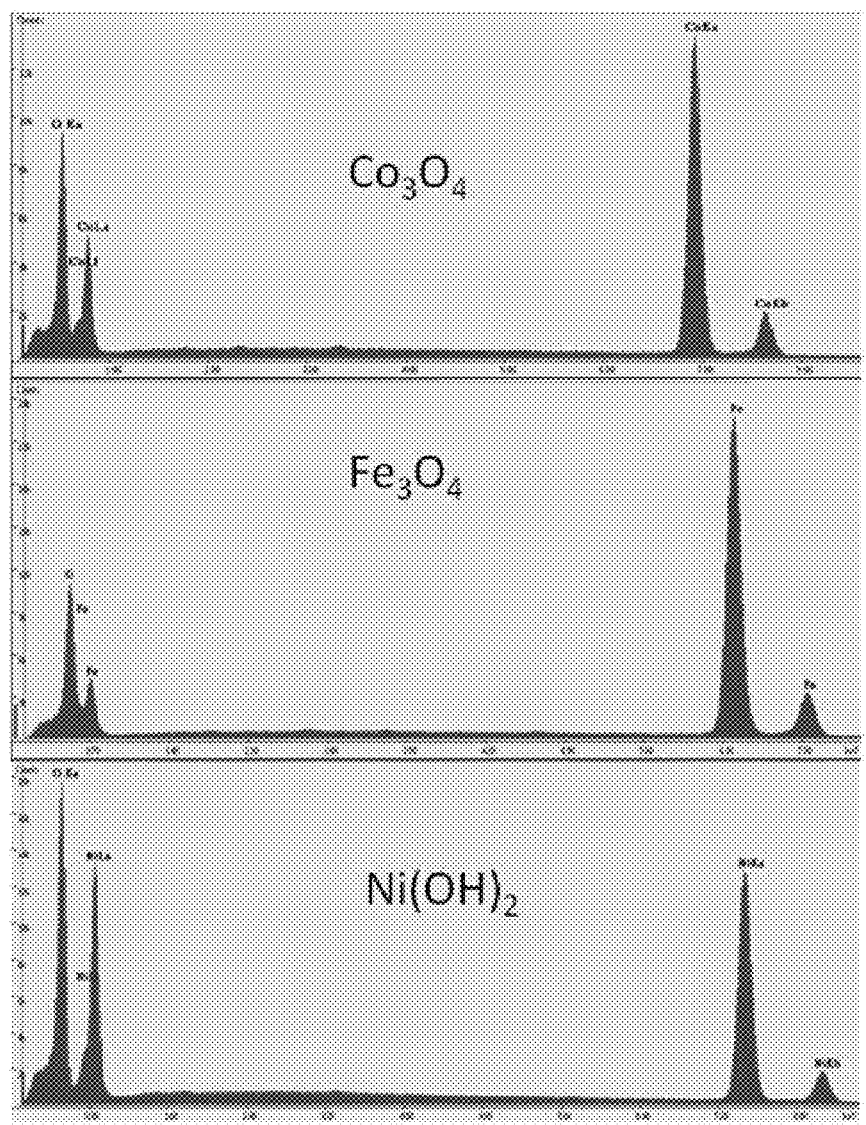
FIG. 2 is an illustration of JOEL SEM EDAX showing no remaining potassium, sulfate, chlorine or acetate.

Elemental analysis was performed on a JOEL SEM in EDAX mode. Because the metal salts either have chlorine, acetate or sulfate as the anion, EDAX data was collected on the $Fe_3O_4$ made from $FeCl_2$, $Co_3O_4$ made from $CoSO_4$ and the $Ni(OH)_2$ made from nickel acetate. As seen in FIG. 2, EDAX showed only the presence of the metal and oxygen.

Figure 3:
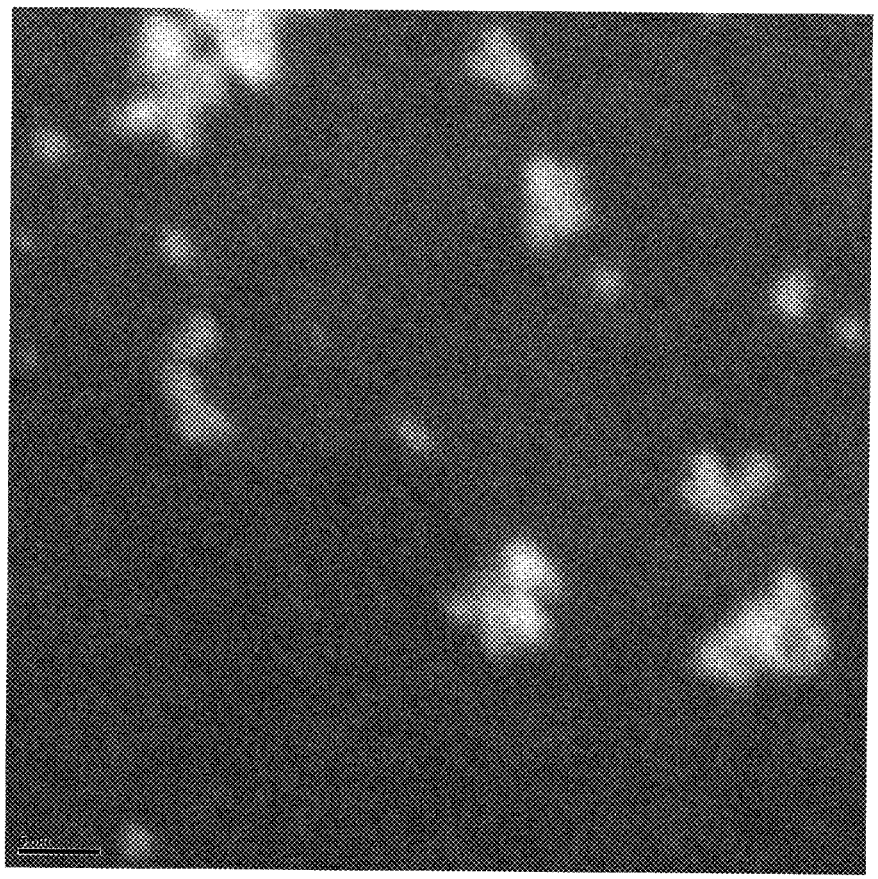
FIG. 3 is an illustration of a transmission electron microscopic image of $ZnO_2$ nanoparticulates. Average size estimate 1.7 nM.

Particle size analysis was primarily performed on the Rigaku SmartLab using the PDXL2 program. Peaks were fit via a Split Psuedo-Voigt function and refined to minimize % Re and S, which provide a measure of the accuracy of the degree of fit to the x-ray diffraction pattern. For the $ZnO_2$ size analysis, TEM images were also taken in order to confirm the X-ray analyses. As shown in FIG. 3, the TEM indicates that the $ZnO_2$ particles were approximately 1.7 nM, which is in good agreement with the X-ray analysis, which calculated an average particle size of 1.63 nM. This falls within the expected deviation of +5%, as reported in literature when comparing X-ray particle size analysis to TEM particle size analysis.

Figure 4:
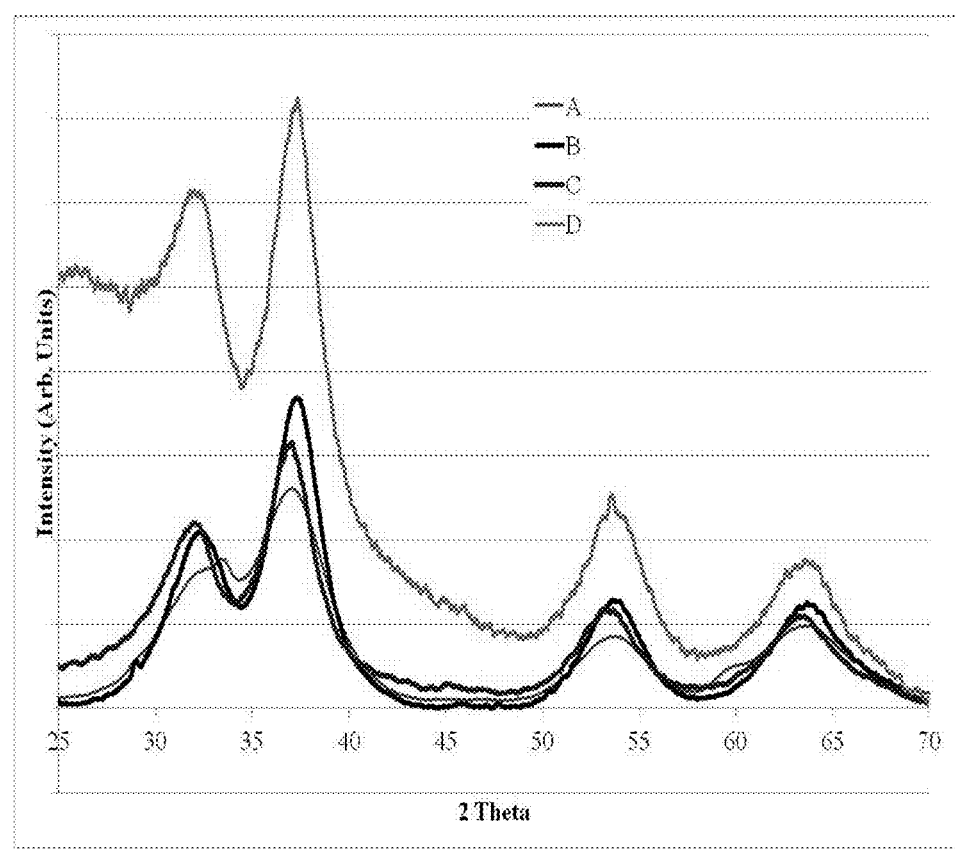
FIG. 4 is an illustration of X-ray diffraction patterns of $ZnO_2$.

One additional advantage of this approach is that the oxide particles are very stable over time, even when dry. The TEM images were taken of a week old sample of nanometer sized $ZnO_2$ particles. As shown in FIG. 4 where A is the initial $ZnO_2$ sample, B and C are the same sample of 1 and then 2 weeks of aging. Pattern D shows the $ZnO_2$ pattern for the sample with an average particle size of 0.42 nM, which is within experimental effort of the size of a single $ZnO_2$ unit cell.

Figure 5:
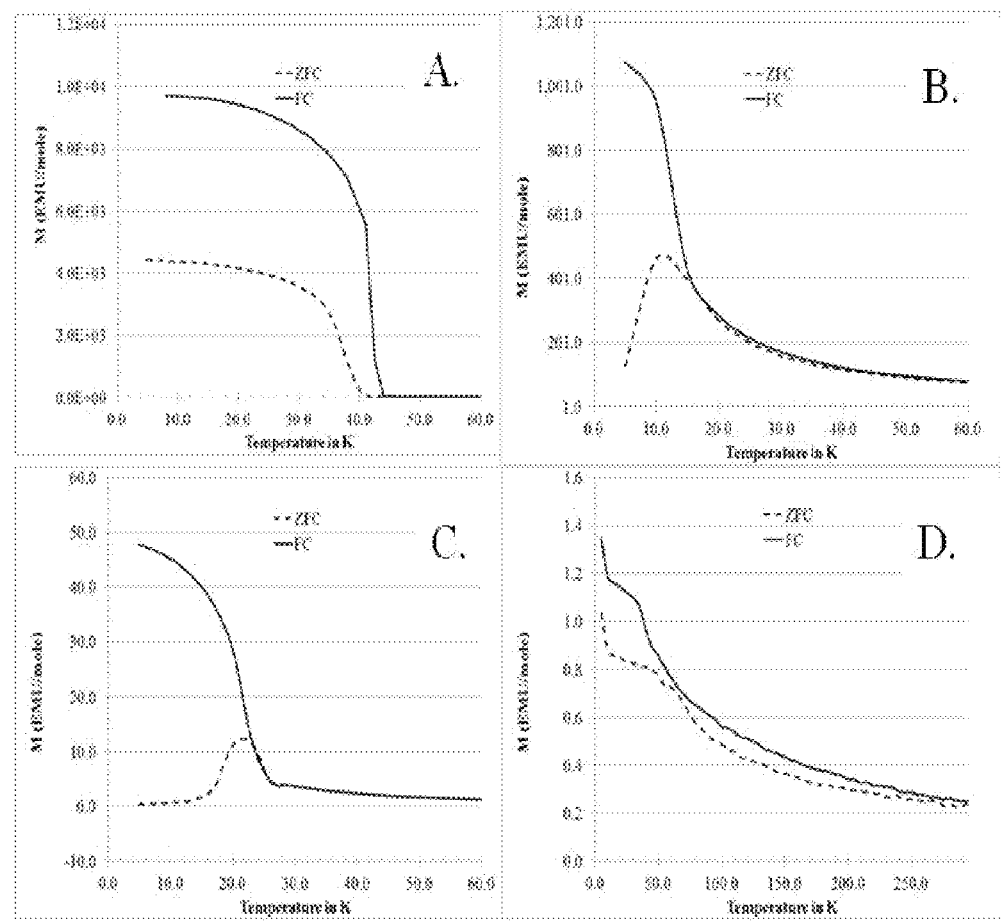
FIG. 5 is an illustration of magnetic data of some of the oxides prepared. A. illustrates $Mn_3O_4$; B. illustrates $Ni(OH)_2$; C. illustrates $Co_3O_4$; and D. illustrates $Cu(OH)_2$.

Magnetic Data was collected to characterize the magnetic behavior of the metal oxide nanoparticles. Behavior observed was very similar to that predicted in the literature. As shown in FIG. 5A, the $Mn_3O_4$ shows a ferromagnetic transition at approximately 42 K, as expected, as well as significant differences between the field cooled and zero field cooled magnetism. Again confirming the nanoparticulates nature of the oxides prepared.

FIG. 5b shows the low temperature onset of ferromagnetism of $Ni(OH)_2$ nanoparticles as shown in literature. FIG. 5C shows similar behavior for the $Co_3O_4$ nanoparticles, with a ferromagnetic onset at 25 K, as expected from literature. FIG. 5D shows the paramagnetic behavior of $Cu(OH)_2$. It is important to note that there is a very minimal upturning at low temperature indicating the high purity of the copper hydroxide product.

Another additional advantage is the use of these nanomaterials as precursors to even smaller metal particles. Typically, metal particles are formed by the reduction of a metal salt in a solution using a reducing agent such as $NaBH_4$. A good general method for this is called the polyol method, when ethylene glycol, or other type of glycol is used as the solvent.

Here we prepared metal nanoparticles from the $Ni(OH)_2$ and $Cu(OH)_2$ nanoparticles. Typically, 3 grams of material were dissolved in 100 mL of ethylene glycol. In order to limit the formation of large particles, the $NaBh_4$ was added in small amounts until a few flake like crystals could be seen in solution. This was determined to be the end point in the reduction, and the solution was further diluted by the addition of 50 mL of water. This was then spun down and centrifuged several times in methanol to remove the water and ethylene glycol. The metal particles were then dried under a dynamic vacuum for 24 hours and then characterized by x-ray diffraction. Initial tests on reduction of $Ni(OH)_2$ showed that nanoparticles of 12 nM were produced.

As described herein, this is a simple, one step method for creating oxide nanoparticles. The oxide nanoparticles are as small as an individual unit cell.

This method is applicable for producing oxides nanoparticles for most of the metals or ceramic precursors in the periodic table.

The synthesis technique does not require the use of expensive capping agents or complex chemicals to perform.

The synthesis produced grams of material and is scalable, whereas other synthetic methods can only generate micrograms of material.

This approach can also be used to create blends of metal oxide particulates suitable for inks in various types of 3-d and 2-d processing techniques, including metal oxide inks, as well as ceramic inks.

Additionally, blends of different oxides, such as oxide particles of yttrium, barium and copper could be combined to create a nanoparticulate precursor to the $YBa_2Cu_3O_{7-x}$ superconductor.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What I claim is:

1. A method of making unit cell sized oxide particulates, comprising:
   preparing a water solution of a metal or ceramic salt;
   stirring the water solution;
   adding $KO_2$ to the water solution and forming a reaction solution comprising metal oxide nanoparticles wherein the metal oxide nanoparticles are selected from the group consisting of $Fe_3O_4$, $Mn_3O_4$, $ZnO_2$, and $Pt_2O$;
   stirring the reaction solution;
   placing the reaction solution in a centrifuge tube;
   spinning down the reaction solution; and
   harvesting the metal oxide nanoparticles wherein the metal oxide nanoparticles are selected from the group consisting of $Fe_3O_4$, $Mn_3O_4$, $ZnO_2$, and $Pt_2O$.

2. The method of making unit cell sized oxide particulates of claim 1 wherein the step of stirring the reaction solution is for about 10 minutes to about 1 hour.

3. The method of making unit cell sized oxide particulates of claim 2 wherein the step of spinning down comprises removing excess water.

4. The method of making unit cell sized oxide particulates of claim 3 wherein the step of spinning down to remove excess water is repeated until the remaining solution is pH neutral.

5. The method of making unit cell sized oxide particulates of claim 1 further including the step of:
   cleansing the oxide nanoparticles.

6. The method of making unit cell sized oxide particulates of claim 5 wherein the step of cleansing the oxide nanoparticles further comprises the steps of suspending the oxide nanoparticles in methanol and spinning down and removing the water and the methanol.

7. The method of making unit cell sized oxide particulates of claim 6 further comprising the step of:
   drying the oxide nanoparticles under a dynamic vacuum at room temperature.

8. The method of making unit cell sized oxide particulates of claim 7 wherein the step of drying under a dynamic vacuum is at about $10^{-3}$ torr.

9. The method of making unit cell sized oxide particulates of claim 1 further comprising the step of:
   diluting the reaction solution by 50% with methanol after the step of adding a 2-fold molar excess of $KO_2$ to the water solution and forming a reaction solution.

10. The product of the process of preparing a water solution of a metal or ceramic salt; stirring the water solution; adding a 2-fold molar excess of $KO_2$ to the water solution and forming a reaction solution; stirring the reaction solution; placing the reaction solution in a centrifuge tube; spinning down the reaction solution; and creating oxide nanoparticles wherein the oxide nanoparticles are unit cell sized and are selected from the group consisting of $Fe_3O_4$ $Mn_3O_4$, $ZnO_2$, and $Pt_2O$.

* * * * *